May 27, 1930. F. SEIGHEIM 1,760,321
VACUUM CONTAINER
Filed March 24, 1928 2 Sheets-Sheet 1
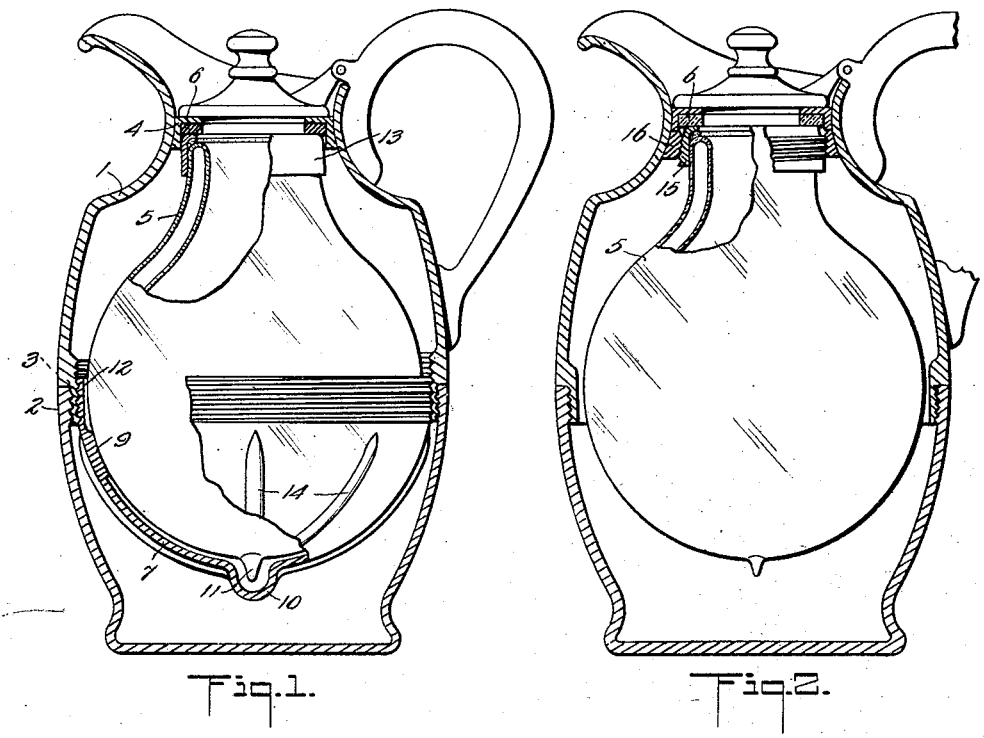
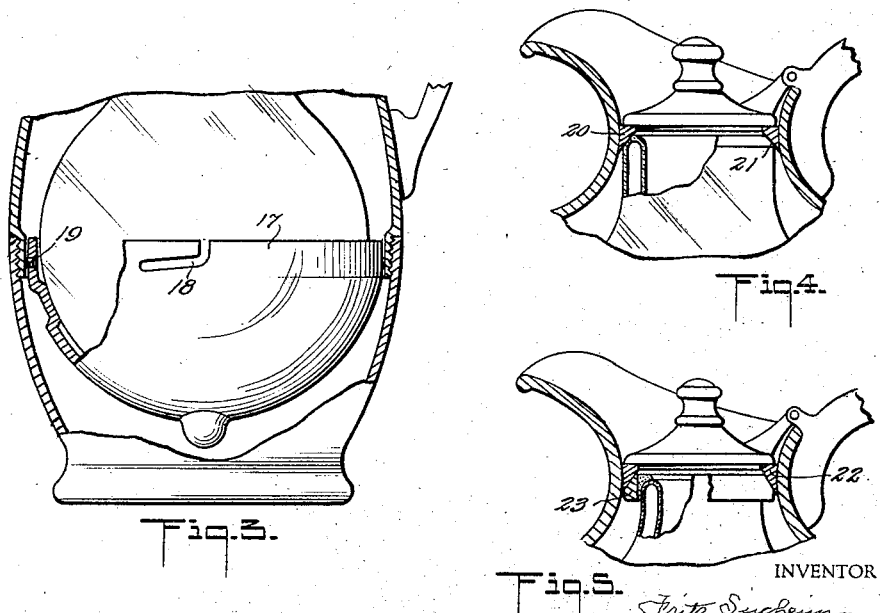
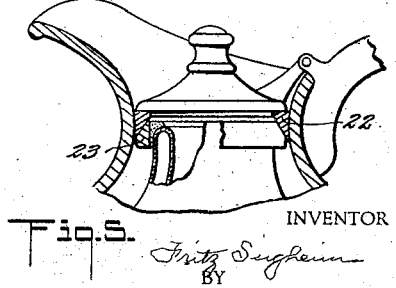

May 27, 1930.  F. SEIGHEIM  1,760,321
VACUUM CONTAINER
Filed March 24, 1928  2 Sheets-Sheet 2

INVENTOR
Fritz Seigheim
BY
James W. Berry
ATTORNEY

Patented May 27, 1930

1,760,321

UNITED STATES PATENT OFFICE

FRITZ SEIGHEIM, OF NEW YORK, N. Y.

VACUUM CONTAINER

Application filed March 24, 1928. Serial No. 264,564.

This invention relates to vacuum containers and is directed to containers which are adapted to be used in connection with various serving utensils, such as coffee or tea pots, pitchers, and the like, and the object is to produce a vacuum container for this purpose which may be readily secured within or removed from the serving utensil, and which is afforded a maximum protection against breakage.

With the above object in view, the invention consists in the novel features of construction hereinafter described, particularly pointed out in the claims and illustrated by the accompanying drawing, in which:

Figure 1 is a vertical sectional view of a serving utensil showing my improved vacuum container secured therein, the said vacuum container being partly in section;

Figure 2 is a similar view showing a somewhat modified construction of the vacuum container;

Figures 6, 7:
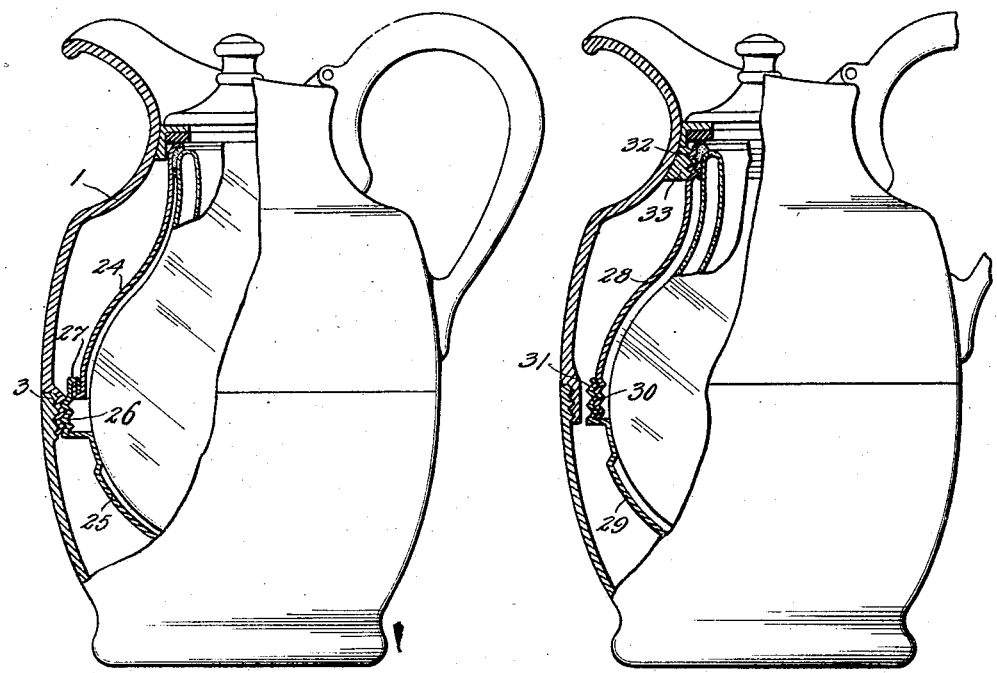
Figure 8:
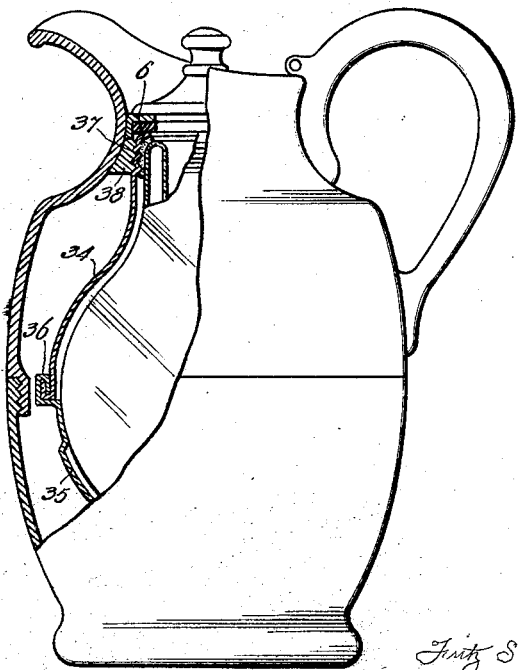

Figure 3, a vertical sectional view of the lower portion of a serving utensil, showing still another modification;

Figure 4 is a sectional view of the upper portion of the serving utensil, showing a modified construction of contact between the upper end of the vacuum container and the neck of the utensil;

Figure 5, a similar view of still another modification of the method of making contact between the upper end of the vacuum container and the neck of the utensil;

Figure 6, a side elevation, partly incased, of a serving utensil showing a modified form of vacuum container, in which the entire glass body of the container is incased or shielded;

Figure 7, a similar view showing another modification of the form in which the entire vacuum container is incased or shielded; and Figure 8, a similar view of still another form, in which the vacuum container is entirely incased or shielded.

Serving utensils, such as coffee pots, tea pots, water pitchers, and the like, in which a vacuum container to hold the liquid to be dispensed is adapted to be removably secured, are in common use, particularly in hotels. These serving utensils consist of two parts, (1) and (2), which are detachably connected at a point substantially midway of their extent. This detachable connection is by means of screw-threads, the upper part (1) having a screw-threaded portion (3), and the lower part (2) interiorly screw-threaded at its upper end to take the threads of said screw-threaded portion (3), which latter is contracted so that when the upper and lower parts are united, their exterior surfaces are flush. The upper part (1) is provided at its neck portion with an interiorly arranged shoulder (4). (5) designates the double-wall glass vacuum container which is of a size and contour to fit within the serving utensil. As ordinarily arranged, the glass vacuum container is inserted in the upper portion of the serving utensil with a rubber gasket (6) between its upper end and the under-side of the shoulder (4), and the lower part (2) of the utensil screwed onto the upper part (1), a spirally coiled spring being utilized between the under-side of the glass vacuum container and the bottom wall of part (2) to hold said vacuum container in contact with the gasket (6).

There is a great deal of breakage in this construction by reason of the contact of the spring with the bottom of the glass vacuum container and, further, there is also leakage around the mouth of the container, the liquid getting between the vacuum container and the interior walls of the upper part (1).

In my improved construction the coil spring is dispensed with and the vacuum container is positively secured within the serving utensil by means of a screw-threaded connection either at a point intermediate of its end at its greatest diameter, as shown in Figures 1 and 6, or by a pin and slot connection at the same point, as shown in Figure 3, or by screw-threads at its upper end, as shown in Figures 2, 7, and 8.

Referring to Figure 1, it will be seen that I provide a metal shield or sheath (7) which is of a size to inclose the glass vacuum container from a point beginning at its greatest diameter and extending about the entire lower portion of said container. This metal shield extends upon the interior of the vacuum container and is formed with an interior seat (9) on which the said container rests. The glass vacuum container is thus, except for contact at this point, supported, out of contact with the shield, as is clearly shown. The shield is formed with an offset or pocket (10) in which the glass nib (11) formed in the closing of the container after the vacuum is seated. Thus breakage is prevented at this point, where such breakage is frequent in the construction now in use. The shield (7) is exteriorly screw-threaded at its upper end as at (12) to take the interior threads formed in the screw-threaded portion (3) of the upper part (1) of the utensil. At its upper end, the vacuum container has cemented thereto a collar (13), the upper edge of which projects over the end of said container and contacts with the under-side of the gasket (6). This collar (13) not only protects the mouth of the vacuum container, but also presents a level surface so that said container may be set up on end when washed without danger of tipping over.

In operation, the vacuum container is screwed into the upper part (1) of the serving utensil, ribs (14) being provided in the shield to enable the fingers to get a good grip and thus facilitate this operation. When the vacuum container is thus secured in place within the upper part (1) of the utensil with the flange of the collar (13) pressed tightly against the gasket (6), the lower part (2) of the serving utensil is screwed into place.

In the form shown in Figure 2, I have dispensed with the shield (7) and have provided the outlet end of the vacuum container (5) with an exteriorly screw-threaded collar (15) which, like the collar (13), has a flange projecting above the end of the container and contacting with the under-side of the gasket (6). These screw-threads on the collar (15) engage threads of a collar (16) located within the neck of the upper part (1) of the serving utensil, just below the interiorly arranged shoulder (4).

In Figure 3, I provide a shield (17) similar to that shown in Figure 1, except instead of detachably securing it to the upper part (1) of the serving utensil by screw-threads, I provide a pin and slot connection, the shield having therein at equal distant points about its circumference the locking slots (18) to take the pins (19) projecting upon the interior of the upper part (1) at its lower end.

In Figure 4, I have shown a modification in the contact of the outer or mouth-end of the vacuum container with the interiorly arranged shoulder within the neck of part (1). In this form, I provide a tapered shoulder or flange (20) and grind the upper end of the glass container to form a tapered portion (21) which contacts with the inclined portion of the shoulder or flange. By means of this construction, a liquid-tight joint is obtained when the vacuum container is secured within part (1) of the serving utensil, without the necessity of employing the gasket (6).

Figure 5 shows a somewhat similar construction. In this form I also use a shoulder or flange (22) having an inclined or tapered portion, but instead of grinding the mouth-end of the vacuum container to form an inclined surface to contact therewith, I secure to that end of the container a collar (23) having an inclined or tapered portion. This collar, as is shown, projects slightly beyond the tapered end of the glass container and thus protects the same and also provides an even surface, so that the vacuum container may be stood on end to drain after it has been cleaned.

In Figure 6, I entirely incase the vacuum container with a metal protective covering or shield, this covering being formed in two parts, (24) and (25), the lower part (25) carrying screw-threads (26) to take the screw-threaded portion (3) of the upper part (1) of the utensil. It will be seen that in this form the upper part (24) of the metal covering or shield projects beyond the upper end of the glass container so as to afford a protection thereto, just as in the case of the collar in Figures 1, 2, and 5. In assembling this shield, the vacuum container is inserted in the upper part (24) and then the lower part (25) is placed in position and the two united by turning in the metal to form a joint as at (27).

In the form shown in Figure 7, I also entirely shield or incase the vacuum container, the two parts (28) and (29) being united by screw-threads, the lower portion of part (28) being threaded at (30) and the upper portion of part (29) being threaded at (31). The upper portion of part (28) in this form is provided at its upper end with screw-threads (32) to engage screw-threads of a collar (33) positioned within the neck of the serving utensil. It will also be noted that in this form the shield projects slightly above the upper end of the vacuum container, for the purpose previously set forth.

In the form shown in Figure 8, the vacuum container is entirely shielded, the shield consisting of the upper part (34) and the lower part (35) which are united at (36) by the same kind of a joint as that shown by (27) in Figure 6. The upper end of the shield is exteriorly screw-threaded at (37), the same as in Figure 7, to engage the screw-threads of the collar or flange (38) positioned in the neck of the serving utensil.

It will be seen that in all of these forms, that is, those shown in Figures 6, 7, and 8, the gasket (6) is used to make a tight joint.

In Figure 1 the seat (9) is shown formed by thickening the metal of which the shield is formed. In Figures 3, 6, 7, and 8, this seat is shown as formed by pressing in the metal of which the shield is formed.

It will be understood that certain features shown in the various figures are not limited to the particular form of vacuum container to which they are applied. For instance, the construction for making contact between the mouth-end of the vacuum container and the seat or flange within the neck of the serving utensil shown in Figures 4 and 5, may be used with the vacuum containers illustrated in Figures 1, 3, and 6, and also that the pin and slot connection shown in Figure 3 may be used in the wholly shielded or incased vacuum container illustrated in Figure 6.

Having thus fully described my invention, what I claim as new and desire to secure by Letters Patent, is:

1. A serving utensil having a casing formed of two parts detachably connected, a vacuum container within said casing and removable therefrom, and screw-threaded means for rigidly securing said container to one of said parts.

2. The combination with a serving utensil having its body formed of two parts detachably connected, of a vacuum container within said utensil, and means for detachably securing the said vacuum container rigidly to one of said parts of the serving utensil independent of the other part.

3. The combination with a serving utensil having its body formed of two detachable parts, of a vacuum container positioned within said body, means for detachably securing the vacuum container to the body, and a metallic shield permanently secured to said vacuum container for protecting said container when the latter is removed from said utensil.

4. The combination with a serving utensil having its body formed of two detachable parts and provided at its outlet end with an internal annular shoulder, of a vacuum container adapted to be positioned within the said body, an exteriorly screw-threaded portion carried by the said vacuum container to engage screw-threads formed upon the interior of the upper part of the body of the utensil to hold the said vacuum container rigidly within the utensil with its upper end in contact with the said shoulder.

5. The combination with a serving utensil having its body formed of two separable parts, the upper part provided with an interiorly screw-threaded portion, of a vacuum container adapted to be positioned within the serving utensil, provided with an exterior metal screw-threaded portion to engage the screw-threads of the upper part of the body.

6. The combination with a serving utensil having its body formed of two parts detachably connected, the upper part having screw-threads formed upon the interior thereof, of a vacuum container having a metallic shield secured to the exterior thereof and formed with exterior screw-threads to take the screw-threads of the upper part of the body of the utensil for the purpose of removably securing the vacuum container within the utensil.

7. The combination with a serving utensil formed of two parts detachably connected and provided with interior screw-threads, of a vacuum container having a metal shield or casing exteriorly screw-threaded to take the interior threads of the body of the utensil, said shield formed with an annular interior seat on which the vacuum container rests for the purpose set forth.

8. The combination with a serving utensil having its body formed of two parts adapted to be detachably connected, of a vacuum container, a metal shield formed of two parts to entirely inclose the vacuum container, means for securing the two parts of the shield or casing together to inclose the said vacuum container, and means for removably securing the vacuum container within the body of the utensil.

FRITZ SEIGHEIM.